(12) United States Patent
Li et al.

(10) Patent No.: US 12,407,387 B2
(45) Date of Patent: Sep. 2, 2025

(54) INFORMATION ACQUISITION METHOD AND APPARATUS, DEVICE, AND STORAGE MEDIUM

(71) Applicant: ZTE CORPORATION, Shenzhen (CN)

(72) Inventors: Yong Li, Shenzhen (CN); Hao Wu, Shenzhen (CN); Guozeng Zheng, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 501 days.

(21) Appl. No.: 17/791,082

(22) PCT Filed: Dec. 30, 2020

(86) PCT No.: PCT/CN2020/141220
§ 371 (c)(1),
(2) Date: Jul. 6, 2022

(87) PCT Pub. No.: WO2021/139577
PCT Pub. Date: Jul. 15, 2021

(65) Prior Publication Data
US 2023/0029296 A1     Jan. 26, 2023

(30) Foreign Application Priority Data

Jan. 7, 2020 (CN) .......................... 202010014775.X

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01); *H04L 5/0094* (2013.01)

(58) Field of Classification Search
CPC .... H04B 7/0626; H04L 5/0048; H04L 5/0094
See application file for complete search history.

(56) References Cited

U.S. PATENT DOCUMENTS

2016/0149679 A1\* 5/2016 Frenne .................... H04L 5/005
370/329
2018/0115357 A1    4/2018 Park et al.
(Continued)

FOREIGN PATENT DOCUMENTS

CN           103873124 A           6/2014
CN           105309030 A           2/2016
(Continued)

OTHER PUBLICATIONS

Huawei, et al., "Correction on UL non-codebook based transmission in 38.214", 3GPP TSG RAN WG1 NR Ad Hoc Meeting R1-1800927, Vancouver, Canada, Jan. 22-26, 2018, 4 pages.
(Continued)

*Primary Examiner* — Brenda H Pham
(74) *Attorney, Agent, or Firm* — Morgan, Lewis & Bockius LLP

(57) ABSTRACT

Provided are an information acquisition method and apparatus, a device, and a storage medium. The method includes: determining the first configuration information of a CSI report, where the first configuration information includes a CSI-RS resource associated with the CSI report and an SRS resource associated with the CSI report, the CSI-RS resource is configured for carrying a channel state information reference signal, and the SRS resource is configured for carrying a sounding reference signal; sending the first configuration information to a second communication node; receiving the CSI report fed back by the second communication node, where the CSI report is generated according to the measurement performed on the channel state information
(Continued)

reference signal carried in the CSI-RS resource; and obtaining corresponding channel state information according to the CSI report.

16 Claims, 3 Drawing Sheets

(56) References Cited

U.S. PATENT DOCUMENTS

| | | | | |
|---|---|---|---|---|
| 2018/0287757 | A1* | 10/2018 | Onggosanusi | ........ H04L 5/0092 |
| 2018/0367287 | A1* | 12/2018 | Chen | ................... H04L 25/0224 |
| 2019/0109679 | A1* | 4/2019 | Liu | ....................... H04L 5/0048 |
| 2019/0260448 | A1 | 8/2019 | Rahman et al. | |

FOREIGN PATENT DOCUMENTS

| | | |
|---|---|---|
| CN | 108933648 A | 12/2018 |
| CN | 109151887 A | 1/2019 |
| CN | 110100467 A | 8/2019 |
| CN | 111901080 A | 11/2020 |
| WO | WO-2019072138 A1 | 4/2019 |
| WO | WO-2019192360 A1 | 10/2019 |

OTHER PUBLICATIONS

International Search Report for Application No. PCT/CN2020/141220, dated Mar. 25, 2021, 4 pages including English translation.
Qualcomm Incorporated, "Maintenance for Non-Codebook Based UL Transmission", 3GPP TSG RAN WG1 Meeting #92 R1-1802819, Feb. 26-Mar. 2, 2018, Athens, Greece, 4 pages.
Extended European Search Report of Application No. 20912325.6, dated Jan. 22, 2024, 8 pages.
First Office Action in Chinese Application No. 202010014775.X, dated Jan. 27, 2025, 12 pages, including translation.
First Search Report in Chinese Application No. 202010014775X, dated Jan. 25, 2025, 12 pages, including translation.
NTT Domomo, Inc., "Status Report of Study on New Radio Access Technology", 3GPP TSG RAN meeting #75, RP-170376, Dubrovnik, Croatia, Mar. 6-9, 2017.

* cited by examiner

INFORMATION ACQUISITION METHOD AND APPARATUS, DEVICE, AND STORAGE MEDIUM

CROSS-REFERENCES TO RELATED APPLICATIONS

This is a National Stage Application, filed under 35 U.S.C. 371, of International Patent Application No. PCT/CN2020/141220, filed on Dec. 30, 2020, which is based on and claims priority to Chinese Patent Application No. 202010014775.X filed with the China National Intellectual Property Administration (CNIPA) on Jan. 7, 2020, the disclosure of which is incorporated herein by reference in its entirety.

TECHNICAL FIELD

The present application relates to communication, for example, an information acquisition method and apparatus, a device, and a storage medium.

BACKGROUND

Radio communication provides convenience for human life and production and improves efficiency. The 5th-Generation New Radio (5G NR) radio communication network is designed based on the orthogonal frequency-division multiplexing (OFDM) technology. A time domain unit structure for using the OFDM technology to perform radio communication network transmission includes a slot formed by a certain number of OFDM symbols and a radio frame formed by a certain number of slots. The frequency domain unit structure of transmission includes a resource block (RB) formed by a certain number of subcarriers. In the radio communication network transmission, a radio communication system can formulate a transmission strategy according to channel state information (CSI). However, in the process of acquiring channel state information, a corresponding sounding reference signal, a corresponding channel state information reference signal, and a corresponding CSI report need to be matched independently, which increases transmission complexity.

SUMMARY

Embodiments of the present application provide an information acquisition method and apparatus, a device, and a storage medium to reduce the complexity of transmission.

Embodiments of the present application provide an information acquisition method. The method is applied to a first communication node. The method includes that the first configuration information of a channel state information (CSI) report is determined, where the first configuration information includes an associated channel state information reference signal (CSI-RS) resource and an associated sounding reference signal (SRS) resource, the CSI-RS resource is configured for carrying a channel state information reference signal, and the SRS resource is configured for carrying a sounding reference signal; that the first configuration information is sent to a second communication node; that the CSI report fed back by the second communication node is received, where the CSI report is generated according to the measurement performed on the channel state information reference signal carried in the CSI-RS resource; and that corresponding channel state information is obtained according to the CSI report.

Embodiments of the present application provide an information acquisition method. The method is applied to a second communication node. The method includes that the first configuration information sent by a first communication node is received, where the first configuration information includes an associated channel state information reference signal (CSI-RS) resource and an associated sounding reference signal (SRS) resource, the CSI-RS resource is configured for carrying a channel state information reference signal, and the SRS resource is configured for carrying a sounding reference signal; and that the CSI report is fed back to the first communication node, where the CSI report is generated according to the measurement performed on the channel state information reference signal carried in the CSI-RS resource, and the CSI report is configured for enabling the first communication node to obtain corresponding channel state information through parsing.

Embodiments of the present application provide an information acquisition apparatus. The apparatus is applied to a first communication node. The apparatus includes a determination module, a sending module, a first receiving module, and a parsing module. The determination module is configured to determine the first configuration information of a channel state information (CSI) report. The first configuration information includes an associated channel state information reference signal (CSI-RS) resource and an associated sounding reference signal (SRS) resource. The CSI-RS resource is configured for carrying a channel state information reference signal. The SRS resource is configured for carrying a sounding reference signal. The sending module is configured to send the first configuration information to a second communication node.

The first receiving module is configured to receive the CSI report fed back by the second communication node. The CSI report is generated according to the measurement performed on the channel state information reference signal carried in the CSI-RS resource. The parsing module is configured to obtain channel state information corresponding to the CSI report according to the CSI report.

Embodiments of the present application provide an information acquisition apparatus. The apparatus is applied to a second communication node. The apparatus includes a second receiving module and a feedback module. The second receiving module is configured to receive the first configuration information sent by a first communication node. The first configuration information includes an associated channel state information reference signal (CSI-RS) resource and an associated sounding reference signal (SRS) resource. The CSI-RS resource is configured for carrying a channel state information reference signal. The SRS resource is configured for carrying a sounding reference signal. The feedback module is configured to feed the CSI report back to the first communication node. The CSI report is generated according to the measurement performed on the channel state information reference signal carried in the CSI-RS resource. The CSI report is configured for enabling the first communication node to obtain corresponding channel state information through parsing.

Embodiments of the present application provide a device. The device includes one or more processors and a memory configured to store one or more programs. When executed by the one or more processors, the one or more programs cause the one or more processors to perform the method according to any preceding embodiment.

Embodiments of the present application provide a storage medium. The storage medium stores a computer program.

DETAILED DESCRIPTION

Figure 1:
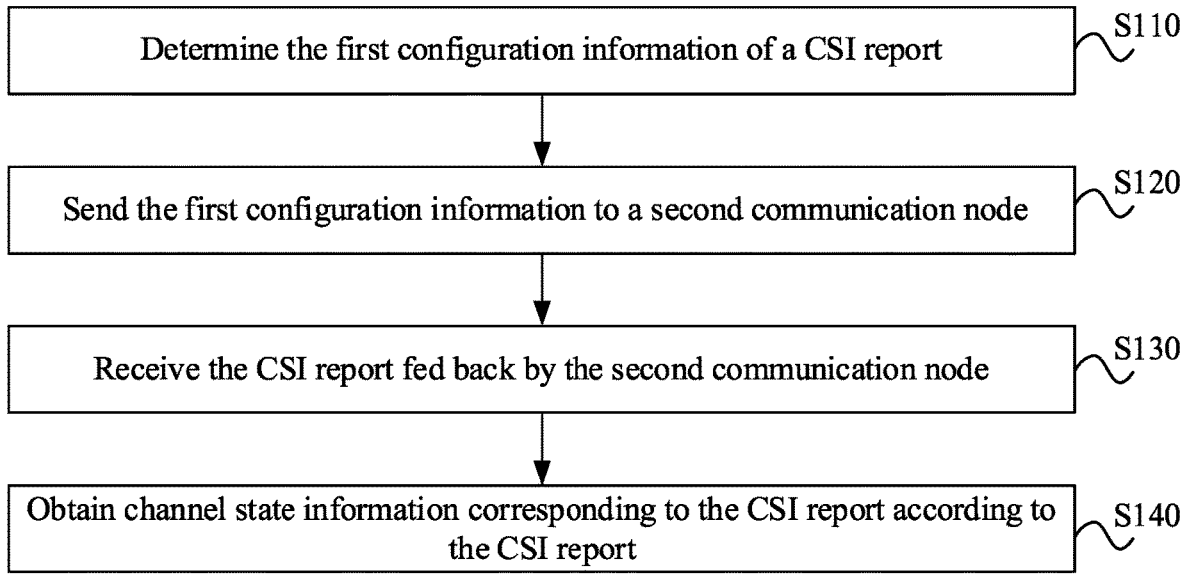
FIG. 1 is a flowchart of an information acquisition method according to an embodiment of the present application.

Embodiments of the present application are described hereinafter in conjunction with drawings.

To acquire high-precision channel state information, a second communication node sends an uplink sounding reference signal (SRS) to a first communication node. A base station performs measurements on the uplink sounding reference signal to acquire a channel coefficient matrix, information about arrival angle and departure angle, and multipath delay information. The first communication node estimates a spatial domain filter of a downlink channel and the frequency domain precoding of the downlink channel according to the obtained uplink channel information and the reciprocity of uplink and downlink channels and then transmits a channel state information reference signal (CSI-RS) to a terminal. The CSI-RS of each port is generated by weighting a spatial domain filter and a frequency domain precoding codeword. That is, the CSI-RS of each port corresponds to a pair of a spatial domain filter and a frequency domain precoding codeword. The second communication node reports the channel state information to the first communication node according to the measurement performed on each CSI-RS. In this embodiment, the channel state information includes precoding matrix information.

One spatial domain filter is a group of weighted factors used on an antenna port to generate synthetic signals transmitted by multiple antennas. The spatial domain filter can separate a signal in a target spatial domain direction, for example, a signal in a target beam direction. One frequency domain precoding code word is a group of weighted factors used in different frequency domains to generate different weighted signals in the frequency domains. Multiple frequency domain precoding code words are weighted to form frequency domain precoding. Elements in the frequency domain precoding act in different frequency domains to generate different weighted signals on the frequency domains. However, this method for acquiring channel state information needs to match the corresponding sounding reference signal, channel state information reference signal and CSI report independently, which is inconvenient for use and increases the transmission complexity.

Embodiments of the present application provide an information acquisition method. In the information acquisition method, a report of channel state information is acquired through a corresponding channel state information reference signal resource and a corresponding sounding reference signal resource and in combination with uplink and downlink channels, reducing the complexity of a base station matching the reception of the sounding reference signal, the sending of the channel state information reference signal, and the reception of the channel state information report for acquiring the channel state information, as well as reducing the complexity of a terminal matching the sending of the sounding reference signal and the reception of the channel state information reference signal for sending the channel state information report.

In an embodiment, FIG. 1 is a flowchart of an information acquisition method according to an embodiment of the present application. This embodiment is applied to a first communication node. In an embodiment, the first communication node may be a base station. As shown in FIG. 1, this embodiment includes S110 to S140.

In S110, the first configuration information of a CSI report is determined.

In the embodiment, the first configuration information includes an associated CSI-RS resource and an associated SRS resource. The CSI-RS resource is configured for carrying a channel state information reference signal. The SRS resource is configured for carrying a sounding reference signal.

In the embodiment, the CSI report is associated with both the CSI-RS resource and the SRS resource through the first configuration information, so that the first communication node can conveniently receive the corresponding uplink sounding reference signal, transmit the corresponding channel state information reference signal, and conveniently receive the corresponding CSI report sent by a second communication node.

In S120, the first configuration information is sent to the second communication node.

In the embodiment, after the first communication node determines the first configuration information of the CSI report, the first configuration information associated with both the CSI-RS resource and the SRS resource is sent to the second communication node so that the second communication node can conveniently send the corresponding uplink sounding reference signal and receive the corresponding channel state information reference signal.

In S130, the CSI report fed back by the second communication node is received.

In the embodiment, the CSI report is generated according to the measurement performed on the channel state information reference signal carried in the CSI-RS resource. In the embodiment, after the second communication node receives the first configuration information of the CSI report, the second communication node obtains the CSI report according to the measurement performed on the channel state information reference signal transmitted by the first communication node, that is, the channel state information reference signal carried in the CSI-RS resource. Then the CSI report is fed back to the first communication node.

In S140, corresponding channel state information is obtained according to the CSI report.

In the embodiment, the first communication node parses the information in the CSI report to obtain the corresponding channel state information.

In an embodiment, the first communication node receives the uplink sounding reference signal carried in the associated SRS resource and transmitted by the second communication node, extracts the channel information from the uplink sounding reference signal, and determines, according to the reciprocity of uplink and downlink channels, a spatial domain filter and a frequency domain precoding codeword that are configured for downlink transmission. The first communication node transmits the channel state information reference signal, generated by weighting the spatial domain filter and the frequency domain precoding codeword, on the CSI-RS resource and then receives the CSI report that is generated by the second communication node according to the measurement performed on the channel state information reference signal.

In an embodiment, the manner of associating the CSI-RS resource in the first configuration information includes one of the following: associating the identifier of the CSI-RS resource or associating the identifier of a set to which the CSI-RS resource belongs. The manner of associating the SRS resource in the first configuration information includes one of: associating the identifier of the SRS resource or associating the identifier of a set to which the SRS resource belongs.

In an embodiment, the identifier of the CSI-RS resource is associated in the first configuration information; alternatively, the identifier of the set to which the CSI-RS resource belongs is associated in the first configuration information. Exemplarily, the identifier of the associated CSI-RS resource may be described in the first configuration information; alternatively, the identifier of the set to which the associated CSI-RS resource belongs may be described in the first configuration information.

In an embodiment, the identifier of the SRS resource is associated in the first configuration information; alternatively, the identifier of the set to which the SRS resource belongs is associated in the first configuration information. Exemplarily, the identifier of the associated SRS resource may be described in the first configuration information; alternatively, the identifier of the set to which the associated SRS resource belongs may be described in the first configuration information.

In an embodiment, the association position of the CSI-RS resource and the association position of the SRS resource include one of: different positions of the first configuration information, the same position of the first configuration information, or adjacent positions of the first configuration information.

In an embodiment, the manner of associating both the CSI-RS resource and the SRS resource in the first configuration information includes: describing the associated CSI-RS resource and the associated SRS resource in different positions of the first configuration information, or describing the associated CSI-RS resource and the associated SRS resource in the same position of the first configuration information, or describing the associated CSI-RS resource and the associated SRS resource in adjacent positions of the first configuration information. The first configuration includes the information associated with the CSI-RS resource and the information associated with the SRS resource. The report of the channel state information can be acquired through the corresponding CSI-RS resource and the corresponding SRS resource and in combination with uplink and downlink channels, which reduces the complexity of the first communication node matching the reception of the sounding reference signal for acquiring the channel state information, the sending of the channel state information reference signal, and the reception of the channel state information. In an embodiment, different positions of the first configuration information may be, for example, different lines of the first configuration information or different pages of the first configuration information; the same position of the first configuration information may be, for example, the same line of the first configuration information or the same page of the first configuration information; and adjacent positions of the first configuration information may be, for example, two adjacent lines of the first configuration information or two adjacent pages of the first configuration information. This is not limited here.

In an embodiment, in some scenarios, the transmission of the channel state information report, the transmission of the channel state information reference signal, and the transmission of the uplink sounding reference signal are performed continuously. In some scenarios, the transmission of the channel state information report, the transmission of the channel state information reference signal, and the transmission of the uplink sounding reference signal are performed discontinuously. For these scenarios where transmissions are performed discontinuously, one solution of notifying the transmission of the channel state information report is to use a signaling for triggering, for example, a downlink control information format signaling is used for triggering.

In an embodiment, in the case where the CSI report, the channel state information reference signal, and the sounding reference signal are transmitted discontinuously, the information acquisition method further includes using a downlink control information (DCI) format signaling to simultaneously trigger at least two of the following events: the first communication node receiving the sounding reference signal; the first communication node transmitting the channel state information reference signal; or the first communication node receiving the CSI report.

In an embodiment, the first communication node can use one DCI format signaling to simultaneously trigger any two of the following events: the first communication node receiving the sounding reference signal; the first communication node transmitting the channel state information reference signal; or the first communication node receiving the CSI report. In an embodiment, the first communication node can use one DCI format signaling to simultaneously trigger the following events: the first communication node receiving the sounding reference signal; the first communication node transmitting the channel state information reference signal; and the first communication node receiving the CSI report. In the embodiment, the execution sequence of these three events may be as follows: the first communication node receives the sounding reference signal; the first communication node transmits the channel state information reference signal; and the first communication node receives the CSI report.

In the embodiment, only one DCI format signaling is configured for triggering the three associated events, that is, an entire event process of the acquisition of the channel state information. That is, one DCI format signaling facilitates the progress of each event in the acquisition of the channel state information and completes the acquisition of the channel state information. Therefore, in comparison with using a signaling to trigger each event independently, this method saves the signaling overhead, the number of signalings used by the first communication node, and the number of signalings received by the second communication node.

In an embodiment, the first communication node uses one DCI format signaling to simultaneously trigger the preceding three events. In an embodiment, the DCI format signaling describes the sounding reference signal, the channel state information reference signal, and the channel state information report or describes the identifier of the sounding reference signal, the identifier of the channel state information reference signal, and the identifier of the channel state information report.

In an embodiment, the DCI format signaling includes at least one of: the sounding reference signal, the channel state information reference signal, or the CSI report.

In an embodiment, the DCI format signaling includes at least one of: the identifier of the sounding reference signal, the identifier of the channel state information reference signal, or the identifier of the CSI report.

In an embodiment, the first configuration information of the CSI report includes the associated CSI-RS resource and the associated SRS resource. That is, the DCI format signaling indicates only one of the associated CSI-RS resource or the associated SRS resource to simultaneously trigger the three events (that is, the first communication node receives the sounding reference signal; the first communication node transmits the channel state information reference signal; and the first communication node receives the CSI report), reducing the indication information load included in the DCI format signaling and reducing the complexity of the DCI format signaling.

In an embodiment, the first communication node uses the DCI format signaling to simultaneously trigger the three following events: the first communication node receiving the sounding reference signal; the first communication node transmitting the channel state information reference signal; and the first communication node receiving the CSI report. Exemplarily, the first communication node indicates the identifier of the CSI report in the DCI format signaling. The corresponding CSI report indicated by the identifier of the CSI report, the channel state information reference signal associated with the CSI report, and the sounding reference signal associated with the CSI report are triggered. In the embodiment, according to the identifier of the CSI report indicated by the DCI format signaling, it is convenient to read, from the first configuration information of the CSI report, the description of the associated channel state information reference signal and the description of the associated sounding reference signal. Therefore, when the CSI report is triggered, the corresponding channel state information reference signal and sounding reference signal are triggered conveniently.

In an embodiment, the first configuration information further includes the size of a frequency domain precoding vector and a bandwidth corresponding to the size of the frequency domain precoding vector. The density of the CSI-RS resource in the first configuration information is an integral multiple of a first ratio. The first ratio is a ratio of the size of the frequency domain precoding vector to the bandwidth corresponding to the size of the frequency domain precoding vector. The size of the frequency domain precoding vector is the number of elements included in the frequency domain precoding vector. The density of the CSI-RS resource is the number of resource elements (REs) occupied on average by each port on each resource block (RB).

In an embodiment, in the case where a frequency domain precoding is described in the form of a vector, the frequency domain precoding is referred to as a frequency domain precoding vector. The side of the frequency domain precoding vector is the number of elements included in the frequency domain precoding vector. The frequency domain precoding vector can be analyzed onto a group of orthogonal frequency domain precoding code words. That is, the frequency domain precoding vector can be expressed as a linear combination of a group of orthogonal frequency domain precoding code words. One solution for reporting the channel state information is to report the weight of a frequency domain precoding code word in the linear combination. The weight is based on the measurement performed on a channel coefficient corresponding to the channel state information reference signal of the size of an integral multiple of the frequency domain precoding vector in the bandwidth corresponding to the size of the frequency domain precoding vector. That is, the first configuration information further includes the size of the frequency domain precoding vector and the bandwidth corresponding to the size of the frequency domain precoding vector. Moreover, the density of the channel state information reference signal in the first configuration information is an integral multiple of the first ratio. This arrangement helps support the solution for reporting the channel state information. The density of the channel state information reference signal is an integral multiple of the first ratio. The density of the channel state information reference signal is the number of REs occupied on average by each port on each RB. The first ratio is the ratio of the size of the frequency domain precoding vector to the bandwidth corresponding to the size of the frequency domain precoding vector. The bandwidth is the number converted to and calculated in RB.

In an embodiment, two dimensions in the CSI-RS resource correspond to two dimensions of a precoding matrix in the CSI report. The two dimensions in the CSI-RS resource include a code-division multiplexing group and a code sequence used by each port on the code-division multiplexing group to perform code-division multiplexing. The two dimensions of the precoding matrix in the CSI report include a spatial domain beam vector and a frequency domain precoding code word.

In an embodiment, the channel state information reference signal resource includes resource element groups. A resource element group includes a certain number of resource elements. That is, a resource element group is a set of a certain number of resource elements. A port of the channel state information reference signal is carried in the resource element group in the manner of code-division multiplexing. Such a resource element group is referred to as a code-division multiplexing group (CDM group). Each code-division multiplexing group carries a certain number of ports of the channel state information reference signals. Ports in the same CDM group are multiplexed on the CDM group through different code sequences. That is, a channel state information reference signal resource has two dimensions: one is a CDM group, and the other is a code sequence used by each port on the CDM group to perform code-division multiplexing.

The precoding matrix may be parsed as the linear combination of frequency domain precoding code words under a spatial domain beam vector. That is, the precoding matrix corresponds to two dimensions: one is a spatial domain beam vector, which is also expressed as a spatial domain filter; and the other is a frequency domain precoding code word. One solution for reporting the channel state information is to report weights of precoding code words that correspond to the two dimensions and are in the linear combination.

The establishment of the correspondence between the two dimensions in the reference signal resource and the two dimensions of the precoding matrix is to match the dimensions regarding the reference signal with the dimensions regarding the precoding matrix. That is, the dimensions in the aspect of the signal and configured for measurement are associated with the dimensions configured for reporting. Therefore, several first dimension combinations (that is, spatial domain beam vectors and frequency domain precoding code words) in the CSI report are conveniently associated with ports of the channel state information reference signal, facilitating the search between the several first dimension combinations (that is, spatial domain beam vectors and frequency domain precoding code words) and the ports of the channel state information reference signal, reducing the complexity of the first communication node, and reducing the complexity of the second communication node.

In an embodiment, the code-division multiplexing group corresponds to the spatial domain beam vector. A code sequence used by a port of the channel state information reference signal corresponds to the frequency domain precoding code word.

In the embodiment, the code-division multiplexing group corresponds to the spatial domain beam vector. Four implementation manners how the code sequence used by the port of the channel state information reference signal corresponds to the frequency domain precoding code word are as below.

In manner one, ports carried in the same CDM group correspond to the same spatial domain beam vector.

In manner two, ports using the same code sequence correspond to the same frequency domain precoding code word.

In manner three, ports using the same code sequence and carried in different CDM groups correspond to different spatial domain beam vectors.

In manner four, ports using different code sequences and carried in the same CDM group correspond to different frequency domain precoding code words.

In an embodiment, the code-division multiplexing group corresponds to the frequency domain precoding code word. A code sequence used by a port of the channel state information reference signal corresponds to the spatial domain beam vector.

In the embodiment, the code-division multiplexing group corresponds to the frequency domain precoding code word. Four implementation manners how the code sequence used by the port of the channel state information reference signal corresponds to the spatial domain beam vector are as below.

In manner one, ports carried in the same CDM group correspond to the same frequency domain precoding code word.

In manner two, ports using the same code sequence correspond to the same spatial domain beam vector.

In manner three, ports using the same code sequence and carried in different CDM groups correspond to different frequency domain precoding code words.

In manner four, ports using difference code sequences and carried in the same CDM group correspond to different spatial domain beam vectors.

In an embodiment, the relationships between the CSI-RS resource and the information in the CSI report include one of: a port of the channel state information reference signal corresponding to a first dimension combination of the precoding matrix, where the first dimension combination of the precoding matrix includes a spatial domain beam vector and a frequency domain precoding code word; M ports of the channel state information reference signal corresponding to a first dimension combination of the precoding matrix, where M is a positive integer, and the first dimension combination of the precoding matrix includes a spatial domain beam vector and a frequency domain precoding code word; or all ports of the channel state information reference signal and on one code-division multiplexing group corresponding to a first dimension combination of the precoding matrix, where the first dimension combination of the precoding matrix includes a spatial domain beam vector and a frequency domain precoding code word.

In an embodiment, one port of the channel state information reference signal can be generated through one first dimension combination (that is, a spatial domain beam vector and a frequency domain precoding code word). A port of the channel state information reference signal corresponds to a first dimension combination in a one-to-one manner. From a first dimension combination in the CSI report, a spatial domain beam vector and a frequency domain precoding code word that are used on a specific port of the channel state information reference signal can be easily mapped. In an embodiment, M ports of the channel state information reference signal correspond to one first dimension combination (that is, a spatial domain beam vector and a frequency domain precoding code word). M is a configurable positive integer. In an embodiment, multiple ports can be configured for measuring the same first dimension combination (that is, a spatial domain beam vector and a frequency domain precoding code word) so that the measurement is more accurate. Moreover, M is a configurable positive integer so that M can be configured according to a scenario, making the accuracy of the measurement match the scenario. All ports of the channel state information state reference signal in one CDM group correspond to one first dimension combination (a spatial domain beam vector and a frequency domain precoding code word). Ports on the same CDM group use the same time domain resource and the same channel, thereby not causing a measurement error when measuring a first dimension combination (a spatial domain beam vector and a frequency domain precoding code word) due to channel difference. Therefore, the accuracy of the measuring can be improved.

In an embodiment, a bandwidth corresponding to the CSI report is an integral multiple of the bandwidth corresponding to the size of the frequency domain precoding vector. The bandwidth corresponding to the CSI report is a bandwidth of the reported channel state information.

In the embodiment, the bandwidth corresponding to the CSI report is the bandwidth of the reported channel state information. That is, the channel state information describes the information of a channel on this bandwidth. The bandwidth corresponding to the CSI report is an integral multiple of the bandwidth corresponding to the size of the frequency domain precoding vector so that an orthogonal frequency domain precoding vector or orthogonal frequency domain precoding code word can be conveniently provided in this bandwidth. That is, an orthogonal frequency domain precoding code word can be conveniently configured for a port of the channel state information reference port in this bandwidth. Exemplarily, the bandwidth corresponding to the CSI report is the same as the bandwidth corresponding to the size of the frequency domain precoding vector. Exemplarily, the bandwidth corresponding to the CSI report is twice the bandwidth corresponding to the size of the frequency domain precoding vector.

Figure 2:
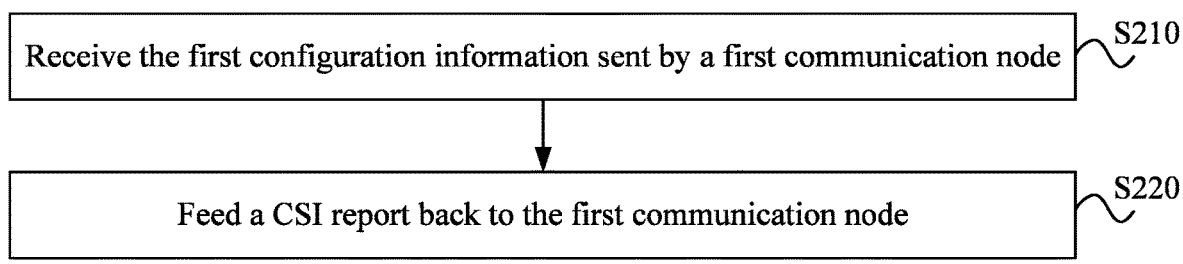
FIG. 2 is a flowchart of another information acquisition method according to an embodiment of the present application.

In an embodiment, FIG. 2 is a flowchart of another information acquisition method according to an embodiment of the present application. This embodiment is applied to a second communication node. In an embodiment, the second communication node may be a user equipment. As shown in FIG. 2, this embodiment includes S210 to S220.

In S210, the first configuration information sent by a first communication node is received.

In the embodiment, the first configuration information includes an associated CSI-RS resource and an associated SRS resource. The CSI-RS resource is configured for carrying a channel state information reference signal. The SRS resource is configured for carrying a sounding reference signal.

In S220, a CSI report is fed back to the first communication node.

In the embodiment, the CSI report is generated according to the measurement performed on the channel state information reference signal carried in the CSI-RS resource. The CSI report is configured for enabling the first communication node to obtain corresponding channel state information through parsing.

In the embodiment, the first communication node is associated with the corresponding CSI-RS resource and the corresponding SRS resource in the first configuration information of the CSI report. With this arrangement, the second communication node can conveniently send the corresponding uplink sounding reference signal and receive the corresponding channel state information reference signal; moreover, a base station can conveniently receive the corresponding uplink sounding reference signal, transmit the corresponding channel state information reference signal, and receive the corresponding channel state information report sent by a terminal. Therefore, the complexity of the second communication node sending the channel state information report to match the sending of the sounding reference signal and the reception of the channel state information reference signal is reduced.

In an embodiment, the second communication node can use one DCI format signaling to simultaneously trigger the following events: the second communication node sending the sounding reference signal; the second communication node receiving the channel state information reference signal; and the second communication node sending the CSI report. In an embodiment, the second communication node can use one DCI format signaling to simultaneously trigger two of the following events: the second communication node sending the sounding reference signal; the second communication node receiving the channel state information reference signal; and the second communication node sending the CSI report. In the embodiment, the second communication node uses only one DCI format signaling to trigger the three associated events, that is, a process of sending the channel state information to the first communication node. Therefore, in comparison with using a signaling to trigger each event independently, this method saves the signaling overhead, that is, the number of signalings received by the second communication node.

Figure 3:
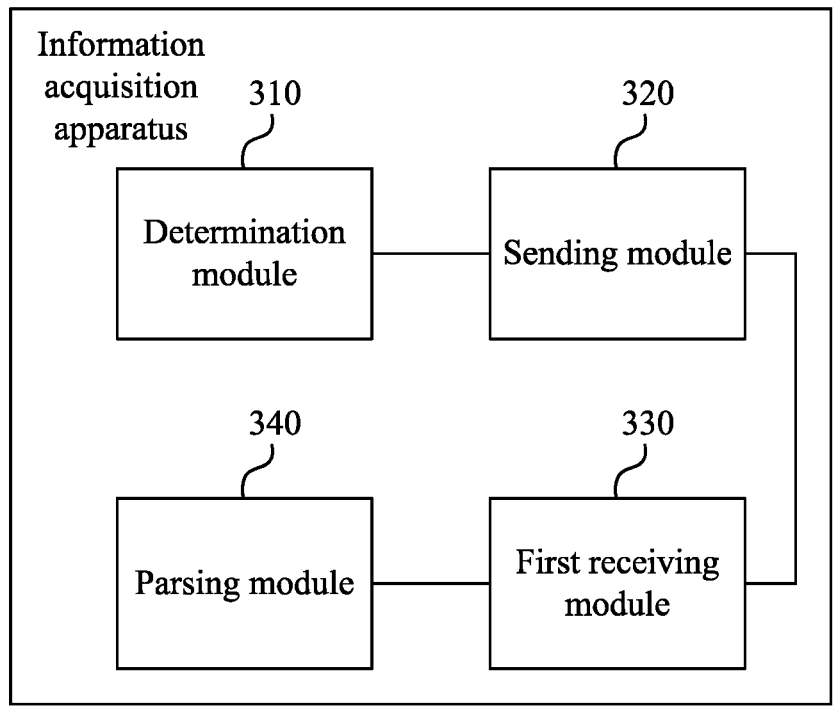
FIG. 3 is a block diagram illustrating the structure of an information acquisition apparatus according to an embodiment of the present application.

In an embodiment, FIG. 3 is a block diagram illustrating the structure of an information acquisition apparatus according to an embodiment of the present application. As shown in FIG. 3, the information acquisition apparatus in this embodiment includes a determination module 310, a sending module 320, a first receiving module 330, and a parsing module 340.

The determination module 310 is configured to determine the first configuration information of a channel state information (CSI) report. The first configuration information includes an associated channel state information reference signal (CSI-RS) resource and an associated sounding reference signal (SRS) resource. The CSI-RS resource is configured for carrying a channel state information reference signal. The SRS resource is configured for carrying a sounding reference signal. The sending module 320 is configured to send the first configuration information to a second communication node. The first receiving module 330 is configured to receive the CSI report fed back by the second communication node. The CSI report is generated according to the measurement performed on the channel state information reference signal carried in the CSI-RS resource. The parsing module 340 is configured to obtain channel state information corresponding to the CSI report according to the CSI report.

The information acquisition apparatus provided in this embodiment is configured to perform the information acquisition method of the embodiment shown in FIG. 1. The implementation principles and technical effects of the information acquisition apparatus provided in this embodiment are similar and are not repeated here.

In an embodiment, the manner of associating the CSI-RS resource in the first configuration information includes one of: associating the identifier of the CSI-RS resource or associating the identifier of a set to which the CSI-RS resource belongs. The manner of associating the SRS resource in the first configuration information includes one of the following: associating the identifier of the SRS resource or associating the identifier of a set to which the SRS resource belongs.

In an embodiment, the association position of the CSI-RS resource and the association position of the SRS resource include one of: different positions of the first configuration information, the same position of the first configuration information, or adjacent positions of the first configuration information.

In an embodiment, in the case where the CSI report, the channel state information reference signal, and the sounding reference signal are transmitted discontinuously, the information acquisition apparatus further includes a triggering module. The triggering module is configured to use a downlink control information (DCI) format signaling to simultaneously trigger at least two of the following events: the first communication node receiving the sounding reference signal; the first communication node transmitting the channel state information reference signal; or the first communication node receiving the CSI report.

In an embodiment, the DCI format signaling includes at least one of: the sounding reference signal, the channel state information reference signal, or the CSI report.

In an embodiment, the DCI format signaling includes at least one of: the identifier of the sounding reference signal, the identifier of the channel state information reference signal, or the identifier of the CSI report.

In an embodiment, the first configuration information further includes the size of a frequency domain precoding vector and a bandwidth corresponding to the size of the frequency domain precoding vector. The density of the CSI-RS resource associated in the first configuration information is an integral multiple of a first ratio. The first ratio is a ratio of the size of the frequency domain precoding vector to the bandwidth corresponding to the size of the frequency domain precoding vector. The size of the frequency domain precoding vector is the number of elements included in the frequency domain precoding vector. The density of the CSI-RS resource is the number of resource elements (REs) occupied on average by each port on each resource block (RB).

In an embodiment, two dimensions in the CSI-RS resource correspond to two dimensions of a precoding matrix in the CSI report. The two dimensions in the CSI-RS resource include a code-division multiplexing group and a code sequence used by each port on the code-division multiplexing group to perform code-division multiplexing. The two dimensions of the precoding matrix in the CSI report include a spatial domain beam vector and a frequency domain precoding code word.

In an embodiment, the code-division multiplexing group corresponds to the spatial domain beam vector. A code sequence used by a port of the channel state information reference signal corresponds to the frequency domain precoding code word.

In an embodiment, the code-division multiplexing group corresponds to the frequency domain precoding code word. A code sequence used by a port of the channel state information reference signal corresponds to the spatial domain beam vector.

In an embodiment, the correspondence relationships between the CSI-RS resource and the information in the CSI report includes one of: a port of the channel state information reference signal corresponding to a first dimension combination of the precoding matrix, where the first dimension combination of the precoding matrix includes a spatial domain beam vector and a frequency domain precoding code word; M ports of the channel state information reference signal corresponding to a first dimension combination of the precoding matrix, where M is a positive integer, and the first dimension combination of the precoding matrix includes a spatial domain beam vector and a frequency domain precoding code word; or all ports of the channel state information reference signal in one code-division multiplexing group corresponding to a first dimension combination of the precoding matrix, where the first dimension combination of the precoding matrix includes a spatial domain beam vector and a frequency domain precoding code word.

In an embodiment, a bandwidth corresponding to the CSI report is an integral multiple of the bandwidth corresponding to the size of the frequency domain precoding vector. The bandwidth corresponding to the CSI report is a bandwidth of the reported channel state information.

Figure 4:
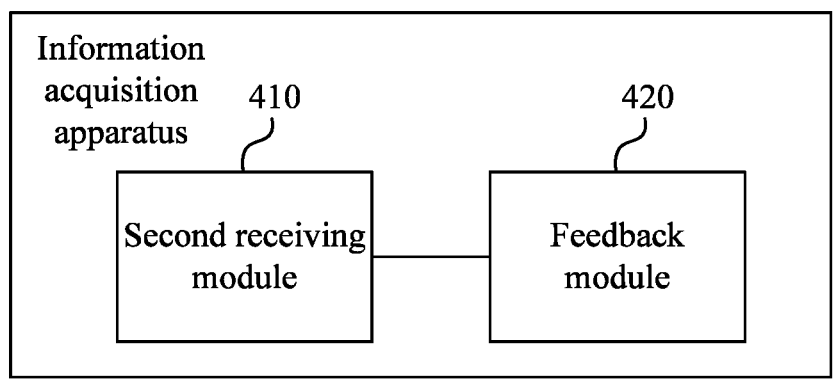
FIG. 4 is a block diagram illustrating the structure of another information acquisition apparatus according to an embodiment of the present application.

In an embodiment, FIG. 4 is a block diagram illustrating the structure of another information acquisition apparatus according to an embodiment of the present application. As shown in FIG. 4, the information acquisition apparatus in this embodiment includes a second receiving module 410 and a feedback module 420.

The second receiving module 410 is configured to receive the first configuration information sent by a first communication node. The first configuration information includes an associated CSI-RS resource and an associated SRS resource. The CSI-RS resource is configured for carrying a channel state information reference signal. The SRS resource is configured for carrying a sounding reference signal. The feedback module 420 is configured to feed the CSI report back to the first communication node. The CSI report is generated according to the measurement performed on the channel state information reference signal carried in the CSI-RS resource. The CSI report is configured for enabling the first communication node to obtain corresponding channel state information through parsing.

The information acquisition apparatus provided in this embodiment is configured to perform the information acquisition method of the embodiment shown in FIG. 2. The implementation principles and technical effects of the information acquisition apparatus provided in this embodiment are similar and are not repeated here.

Figure 5:
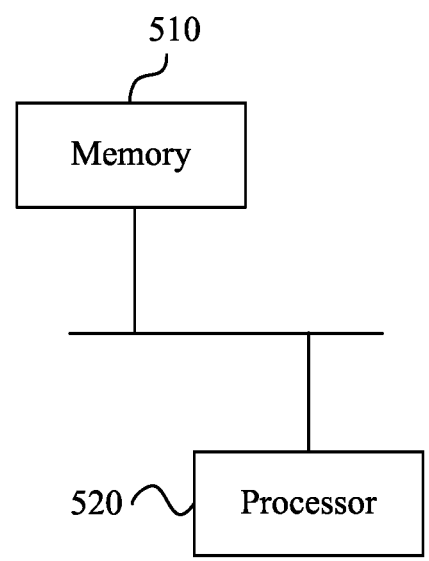
FIG. 5 is a diagram illustrating the structure of a device according to an embodiment of the present application.

FIG. 5 is a diagram illustrating the structure of a device according to an embodiment of the present application. As shown in FIG. 5, the device provided in the present application includes a processor 510 and a memory 520. One or more processors 510 may be provided in the device. One processor 510 is taken as an example in FIG. 5. One or more memories 520 may be provided in the device. One memory 520 is taken as an example in FIG. 5. The processor 510 and the memory 520 of the device are connected by a bus or in other manners. The connection by a bus is taken as an example in FIG. 5. In this embodiment, the device is a first communication node. The first communication node may be a base station.

As a computer-readable storage medium, the memory 520 may be configured to store software programs, computer-executable programs and modules, such as program instructions/modules (for example, the determination module 310, the sending module 320, the first receiving module 330, and the parsing module 340 that are in the information acquisition apparatus) corresponding to the device of any embodiment of the present application. The memory 520 may include a program storage region and a data storage region, where the program storage region may store an operating system and an application program required by at least one function while the data storage region may store data created depending on the use of a device. Additionally, the memory 520 may include a high-speed random-access memory and may further include a non-volatile memory, for example, at least one magnetic disk memory and flash memory or other non-volatile solid-state memories. In some examples, the memory 520 may include memories which are remotely disposed relative to the processor 510 and these remote memories may be connected to the device via a network. Examples of the preceding network include, but are not limited to, the Internet, an intranet, a local area network, a mobile communication network, and a combination thereof.

The preceding device may be configured to perform the information acquisition method provided in any preceding embodiment and have corresponding functions and effects.

In an embodiment, embodiments of the present application further provide a storage medium including computer-executable instructions. When the computer-executable instructions are executed by a computer processor, an information acquisition method applied to a first communication node is performed. The method includes that the first configuration information of a CSI report is determined, where the first configuration information includes an associated CSI-RS resource and an associated SRS resource, the CSI-RS resource is configured for carrying a channel state information reference signal, and the SRS resource is configured for carrying a sounding reference signal; that the first configuration information is sent to a second communication node; that the CSI report fed back by the second communication node is received, where the CSI report is generated according to the measurement performed on the channel state information reference signal carried in the CSI-RS resource; and that corresponding channel state information is obtained according to the CSI report.

In an embodiment, embodiments of the present application further provide a storage medium including computer-executable instructions. When the computer-executable instructions are executed by a computer processor, an information acquisition method applied to a second communication node is performed. The method includes that the first configuration information sent by a first communication node is received, where the first configuration information includes an associated CSI-RS resource and an associated SRS resource, the CSI-RS resource is configured for carrying a channel state information reference signal, and the SRS resource is configured for carrying a sounding reference signal; and that the CSI report is fed back to the first communication node, where the CSI report is generated according to the measurement performed on the channel state information reference signal carried in the CSI-RS resource, and the CSI report is configured for enabling the first communication node to obtain corresponding channel state information through parsing.

It is to be understood by those skilled in the art that the term user equipment encompasses any appropriate type of radio user equipment, such as a mobile phone, a portable data processing apparatus, a portable web browser, or a vehicle-mounted mobile station.

In general, multiple embodiments of the present application may be implemented in hardware or dedicated circuits, software, logics, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in the memory. The memory may be of any type suitable for the local technical environment and may be implemented using any suitable data storage technology, such as, but not limited to, a read-only memory (ROM), a random-access memory (RAM) and an optical memory device and system (a digital video disc (DVD), or a compact disc (CD)). The computer-readable medium may include a non-transitory storage medium. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. An information acquisition method, applied to a first communication node, comprising:
   determining first configuration information of a channel state information (CSI) report, wherein the first configuration information comprises a channel state information reference signal (CSI-RS) resource associated with the CSI report and a sounding reference signal (SRS) resource associated with the CSI report, the CSI-RS resource is configured for carrying a channel state information reference signal, and the SRS resource is configured for carrying a sounding reference signal;
   sending the first configuration information to a second communication node;
   receiving the CSI report fed back by the second communication node, wherein the CSI report is generated according to a measurement performed on the channel state information reference signal carried in the CSI-RS resource; and
   obtaining channel state information corresponding to the CSI report according to the CSI report,
   wherein two dimensions in the CSI-RS resource correspond to two dimensions of a precoding matrix in the CSI report;
   wherein the two dimensions in the CSI-RS resource comprise a code-division multiplexing group and a code sequence used by each port on the code-division multiplexing group to perform code-division multiplexing; and
   wherein the two dimensions of the precoding matrix in the CSI report comprise a spatial domain beam vector and a frequency domain precoding code word.

2. The method according to claim 1, wherein a manner of associating the CSI-RS resource in the first configuration information comprises one of: associating an identifier of the CSI-RS resource or associating an identifier of a set to which the CSI-RS resource belongs; and
   a manner of associating the SRS resource in the first configuration information comprises one of: associating an identifier of the SRS resource or associating an identifier of a set to which the SRS resource belongs.

3. The method according to claim 2, wherein an association position of the CSI-RS resource and an association position of the SRS resource comprise one of:
   different positions of the first configuration information, a same position of the first configuration information, or adjacent positions of the first configuration information.

4. The method according to claim 1, wherein an association position of the CSI-RS resource and an association position of the SRS resource comprise one of:
   different positions of the first configuration information, a same position of the first configuration information, or adjacent positions of the first configuration information.

5. The method according to claim 1, wherein in a case where the CSI report, the channel state information reference signal, and the sounding reference signal are transmitted discontinuously, the method further comprises:
   using a downlink control information (DCI) format signaling to simultaneously trigger at least two of the following events: the first communication node receiving the sounding reference signal, the first communication node transmitting the channel state information reference signal, or the first communication node receiving the CSI report.

6. The method according to claim 5, wherein the DCI format signaling comprises at least one of: the sounding reference signal, the channel state information reference signal, or the CSI report.

7. The method according to claim 5, wherein the DCI format signaling comprises at least one of: an identifier of the sounding reference signal, an identifier of the channel state information reference signal, or an identifier of the CSI report.

8. The method according to claim 1, wherein the first configuration information further comprises a size of a frequency domain precoding vector and a bandwidth corresponding to the size of the frequency domain precoding vector; and
   wherein a density of the CSI-RS resource associated in the first configuration information is an integral multiple of a first ratio, the first ratio is a ratio of the size of the frequency domain precoding vector to the bandwidth corresponding to the size of the frequency domain precoding vector, the size of the frequency domain precoding vector is a number of elements comprised in the frequency domain precoding vector, and the density of the CSI-RS resource is a number of resource elements (REs) occupied on average by each port on each resource block (RB).

9. The method according to claim 8, wherein a bandwidth corresponding to the CSI report is an integral multiple of the bandwidth corresponding to the size of the frequency domain precoding vector, and the bandwidth corresponding to the CSI report is a bandwidth of reported channel state information.

10. The method according to claim 1, wherein the code-division multiplexing group corresponds to the spatial domain beam vector, and a code sequence used by a port of the channel state information reference signal corresponds to the frequency
domain precoding code word.

11. The method according to claim 1, wherein the code-division multiplexing group corresponds to the frequency domain precoding code word, and a code sequence used by a port of the channel state information reference signal corresponds to the spatial domain beam vector.

12. The method according to claim 1, wherein correspondence relationships between the CSI-RS resource and information in the CSI report comprise one of:
    a port of the channel state information reference signal corresponding to a first dimension combination of a precoding matrix, wherein the first dimension combination of the precoding matrix comprises the spatial domain beam vector and the frequency domain precoding code word;
    M ports of the channel state information reference signal corresponding to a first dimension combination of the precoding matrix, wherein M is a positive integer, and the first dimension combination of the precoding matrix comprises the spatial domain beam vector and the frequency domain precoding code word; or
    all ports of the channel state information reference signal in one code-division multiplexing group corresponding to a first dimension combination of the precoding matrix, wherein the first dimension combination of the precoding matrix comprises the spatial domain beam vector and the frequency domain precoding code word.

13. An information acquisition method, applied to a second communication node, comprising:
    receiving first configuration information sent by a first communication node, wherein the first configuration information comprises a channel state information reference signal (CSI-RS) resource associated with a channel state information (CSI) report and a sounding reference signal (SRS) resource associated with the CSI report, the CSI-RS resource is configured for carrying a channel state information reference signal, and the SRS resource is configured for carrying a sounding reference signal; and
    feeding back the CSI report to the first communication node, wherein the CSI report is generated according to a measurement performed on the channel state information reference signal carried in the CSI-RS resource, and the CSI report is configured for enabling the first communication node to obtain corresponding channel state information through parsing,
    wherein two dimensions in the CSI-RS resource correspond to two dimensions of a precoding matrix in the CSI report;
    wherein the two dimensions in the CSI-RS resource comprise a code-division multiplexing group and a code sequence used by each port on the code-division multiplexing group to perform code-division multiplexing; and
    wherein the two dimensions of the precoding matrix in the CSI report comprise a spatial domain beam vector and a frequency domain precoding code word.

14. A device, comprising a memory and at least one processor, wherein
    the memory is configured to store at least one program; and
    when executed by the at least one processor, the at least one program causes the at least one processor to perform:
    determining first configuration information of a channel state information (CSI) report, wherein the first configuration information comprises a channel state information reference signal (CSI-RS) resource associated with the CSI report and a sounding reference signal (SRS) resource associated with the CSI report, the CSI-RS resource is configured for carrying a channel state information reference signal, and the SRS resource is configured for carrying a sounding reference signal;
    sending the first configuration information to a second communication node;
    receiving the CSI report fed back by the second communication node, wherein the CSI report is generated according to a measurement performed on the channel state information reference signal carried in the CSI-RS resource; and
    obtaining channel state information corresponding to the CSI report according to the CSI report,
    wherein two dimensions in the CSI-RS resource correspond to two dimensions of a precoding matrix in the CSI report;
    wherein the two dimensions in the CSI-RS resource comprise a code-division multiplexing group and a code sequence used by each port on the code-division multiplexing group to perform code-division multiplexing; and
    wherein the two dimensions of the precoding matrix in the CSI report comprise a spatial domain beam vector and a frequency domain precoding code word.

15. A non-transitory storage medium storing a computer program, wherein when the computer program is executed by a processor, the method according to claim 1 is performed.

16. A device, comprising a memory and at least one processor, wherein
    the memory is configured to store at least one program; and
    when executed by the at least one processor, the at least one program causes the at least one processor to perform the method according to claim 13.

* * * * *